United States Patent [19]
Parzygnat et al.

[11] Patent Number: 5,784,516
[45] Date of Patent: Jul. 21, 1998

[54] OPTICAL FIBER DISTRIBUTION SHELF ASSEMBLY CONTAINING A MODULAR OPTICAL SWITCH

[75] Inventors: William Joseph Parzygnat, Morris Township, Morris County; Richard Joseph Pimpinella, Hampton; Randy Alan Reagan, Morris Plains, all of N.J.

[73] Assignee: Lucent Technologies Inc., Murray Hill, N.J.

[21] Appl. No.: 713,576

[22] Filed: Sep. 9, 1996

[51] Int. Cl.⁶ .................... G02B 6/00; G02B 6/10
[52] U.S. Cl. ........................................ 385/134
[58] Field of Search ........................ 385/134, 135, 385/136, 147

[56] References Cited

U.S. PATENT DOCUMENTS

| | | | |
|---|---|---|---|
| 5,181,106 | 1/1993 | Sutherland | 359/164 |
| 5,191,456 | 3/1993 | Sutherland et al. | 359/118 |
| 5,204,925 | 4/1993 | Bonanni et al. | 385/89 |
| 5,448,675 | 9/1995 | Leone et al. | 385/135 |
| 5,461,693 | 10/1995 | Pimpinella | 385/135 |
| 5,576,874 | 11/1996 | Czerwiec et al. | 359/123 |
| 5,625,737 | 4/1997 | Saito | 385/137 |
| 5,664,033 | 9/1997 | Scheu et al. | 385/16 |

Primary Examiner—Akm E. Ullah

[57] ABSTRACT

A fiber distribution shelf containing an optical switch within the confines of the shelf structure. The fiber distribution shelf is part of an optical fiber administration system where various stages of switching are used to interconnect an optical time domain reflectometer to the optical fibers that terminate on a fiber distribution shelf within a fiber administration system. By having the shelf optical switch entirely contained within the shelf structure of a fiber distribution shelf, a unique configuration is provided that greatly reduces the size and complexity of the overall fiber administration system.

12 Claims, 4 Drawing Sheets

OPTICAL FIBER DISTRIBUTION SHELF ASSEMBLY CONTAINING A MODULAR OPTICAL SWITCH

RELATED APPLICATIONS

This application is related to the following:

U.S. patent application Ser. No. 08/709,943, entitled OPTICAL SWITCHING APPARATUS AND METHOD FOR USE IN THE CONSTRUCTION MODE TESTING OF A MODULAR FIBER ADMINISTRATION SYSTEM, filed Sep. 08, 1996;

U.S. patent application Ser. No. 08/645,108, entitled AN OPTICAL COMMUNICATIONS SYSTEM HAVING DISTRIBUTED INTELLIGENCE, filed May 13, 1996;

U.S. patent application Ser. No. 08/709,978, entitled FIBER OPTIC OPERATION CENTER, filed Sep. 9, 1996; and U.S. patent application Ser. No. 08/709,977, entitled OPTICAL MONITORING AND TESTING MODULE, filed Sep. 9, 1996.

These applications are herein incorporated into this disclosure by reference.

BACKGROUND OF THE INVENTION

1. Field of the Invention

The present invention relates to optical switches used to connect optical fibers at a central office to a source of optical fiber test signals. More particularly, the present invention relates to an optical switch system that selectively directs optical test signals to optical fibers that are part of a fiber administration system.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein. In such fiber administration systems, the optical distribution frames used at the central office are typically large structures that are arranged in parallel rows. Each optical distribution frame is commonly mounted between the floor and ceiling and only a few feet separate each row of frames.

Each optical distribution frame located at the central office typically defines a plurality of bays, wherein each bay houses several fiber distribution shelves. On each of the fiber distribution shelves are connection modules that receive the ends of all of the individual optical fibers that enter the central office and are contained within the optical fiber network. By terminating each optical fiber at a connection module on one of the different fiber distribution shelves, the location of each optical fiber becomes known within the overall assembly. Once terminated at a known address on one of the fiber distribution shelves, each optical fiber can be selectively coupled to a HDT or a variety of other optical equipment located at the central office. As a result, the optical signals sent along each optical fiber can be selectively controlled.

In order to maintain the quality and integrity of the fiber administration system, the various optical fibers and connections that make up the fiber administration system must be periodically tested. This testing is typically initiated by alarm signals signifying a condition on one or more of the various optical fibers that should be investigated. Since a fiber administration system contains at least one optical fiber distribution frame, a first plurality of bays in each frame, a second plurality of fiber distribution shelves on each bay and a third plurality of fiber connection modules on each shelf, it is advantageous to have multiple levels of switching for a test signal to be directed to a large number of optical fiber lines.

Since, for large fiber counts, different levels of switching are required to direct a test signal to a single optical fiber, multiple optical switches must be provided within the confines of the framework in a distributed manner that defines the fiber administration system. Furthermore, at each switch is a large concentration of optical fibers created by the various leads that must lead to and from each optical switch. The presence of the different switches and the optical leads that connect to the switches causes logistical problems in the fiber administration system framework, where the amount of free space is greatly limited.

A need therefore exists in the art for an optical switch assembly that can adapted to a fiber administration system, wherein the optical switch integrates into the fiber administration system in a space efficient manner in regard to its physical presence and the flow of optical leads to and from the optical switch.

A need also exists for a method of incorporating optical switches into a fiber administration system in a space efficient and distributed manner.

SUMMARY OF THE INVENTION

The present invention is a fiber distribution shelf containing an optical switch within the confines of the shelf structure. The fiber distribution shelf is part of an optical fiber administration system where various levels of switching are used to interconnect an optical time domain reflectometer (OTDR) to the optical fibers that terminate on a fiber distribution shelf within the fiber administration system. The different levels of optical switching include a primary stage optical switch that is coupled directly to the OTDR. The primary stage optical switch selectively couples the OTDR to bay optical switches located at every bay in the framework of the optical fiber administration system. Each bay optical switch selectively couples the OTDR to a shelf optical switch that is part of each fiber distribution shelf. Each shelf optical switch therein selectively couples the OTDR to the optical fibers that terminate on that shelf. By having the shelf optical switch entirely contained within the shelf structure of the fiber distribution shelf, a unique configuration is provided that greatly reduces the size and complexity of the overall fiber administration system.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
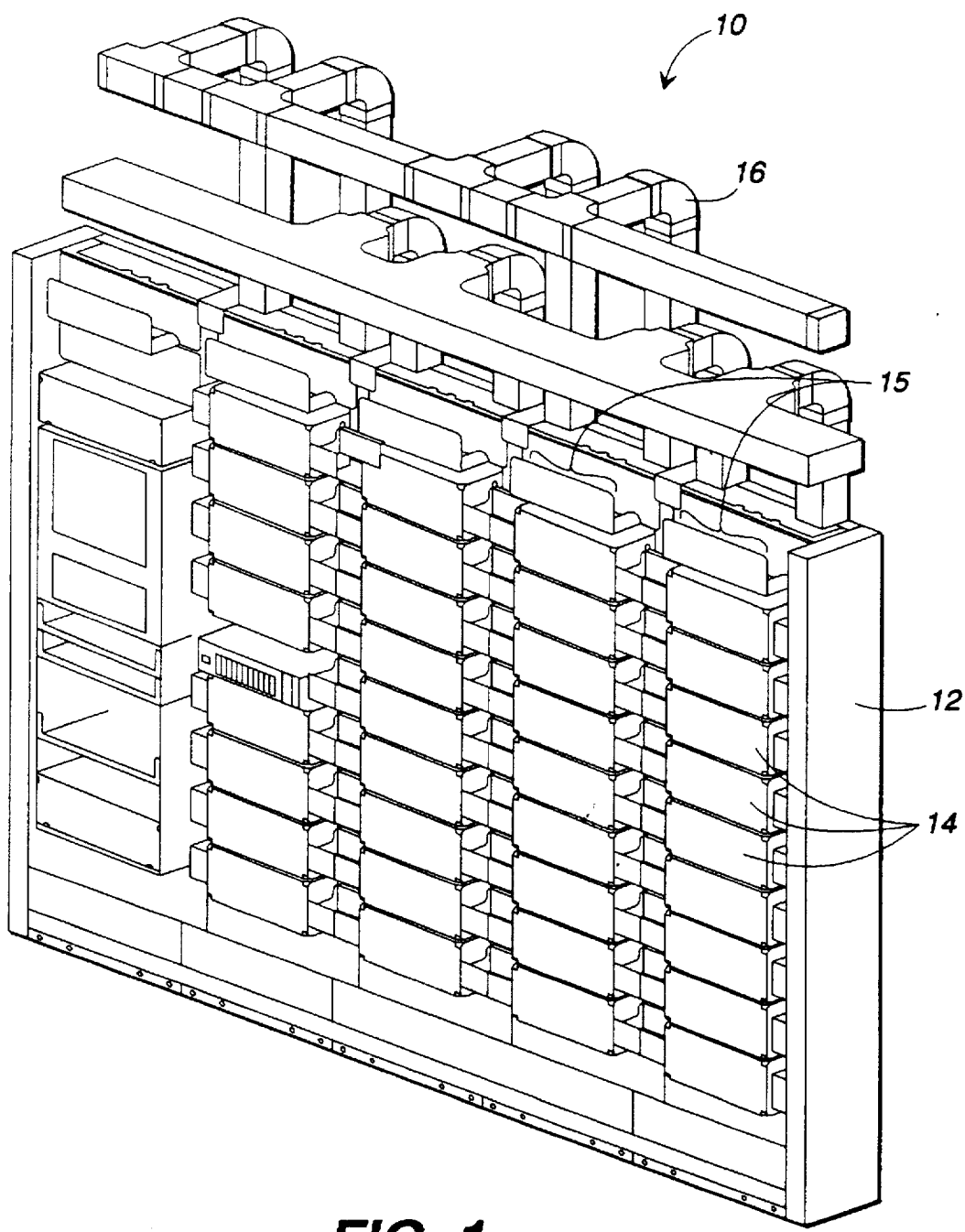
FIG. 1 is a perspective view of an optical fiber administration system containing a first plurality of bays and a second plurality of fiber distribution shelves in each bay.

In FIG. 1, a fiber administration system 10 is shown. Such administration systems are exemplified by the disclosures of U.S. patent application Ser. No. 08/645,108, entitled AN OPTICAL COMMUNICATIONS SYSTEM HAVING DISTRIBUTED INTELLIGENCE, filed May 13, 1996, and U.S. patent application Ser. No. 08/709,978, entitled FIBER OPTIC OPERATION CENTER, filed Sep. 9, 1996. The exemplary fiber administration system 10 includes an optical fiber distribution frame 12 that is affixed in a set position to the floor of a central office. The fiber distribution frame defines a plurality of bays 15. Each bay 15 is a vertical structure that supports a plurality of fiber distribution shelves 14. The fiber distribution shelves 14 come in one of the three standard sizes, having a five inch height, a seven inch height or a nine inch height. A network of conduits 16 lead the various optical fibers from the optical fiber network to the fiber distribution shelves 14.

Figure 2:
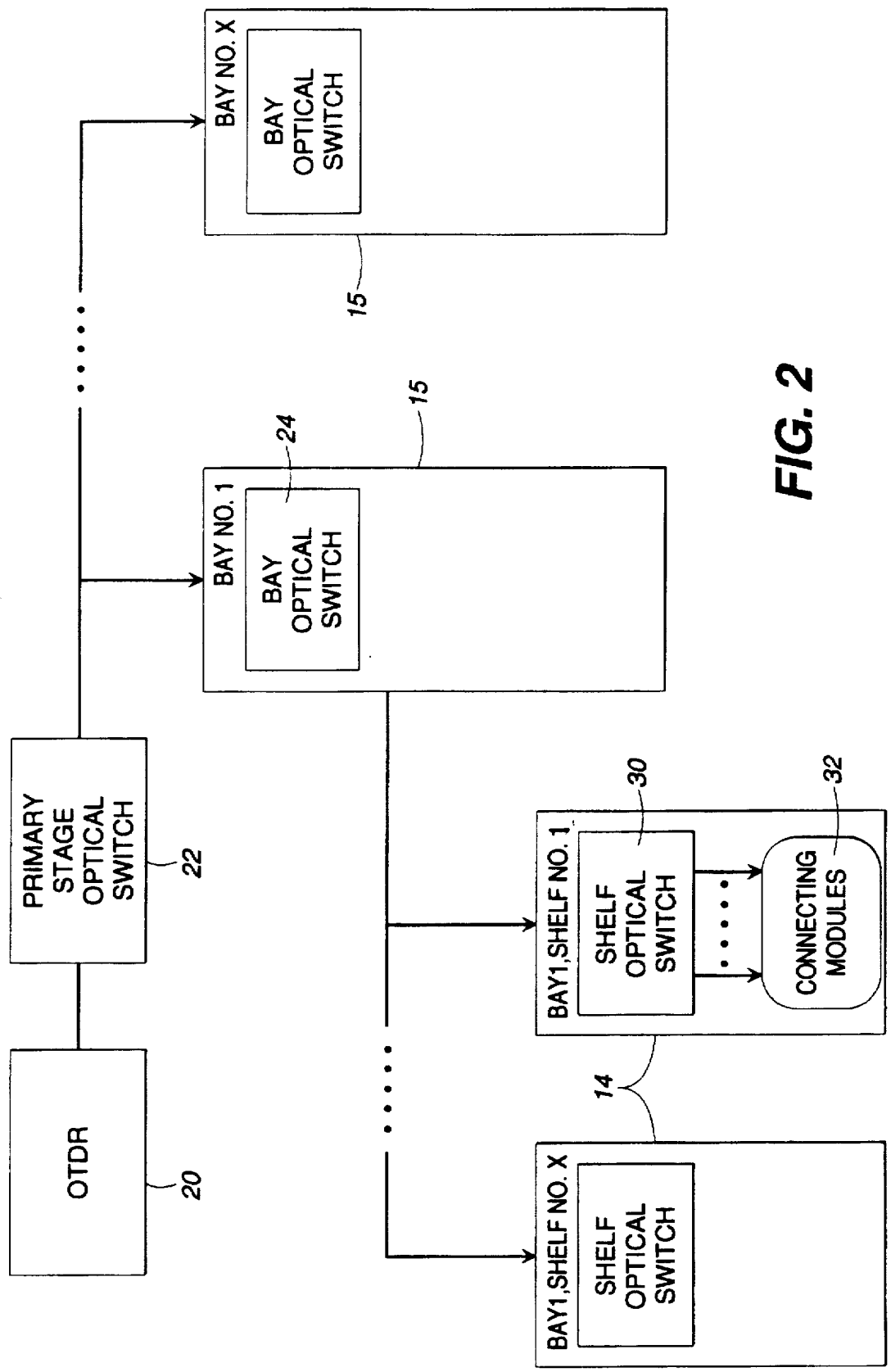
FIG. 2 is block diagram schematic showing the different levels of optical switching between an optical time domain reflectometer and the connection modules contained within the fiber administration system.

Contained within the framework of the optical fiber administration system 10 is an optical time domain reflectometer (OTDR) that is used in the testing of the various optical fibers that are part of the fiber administration system 10. Referring to FIG. 2, it can be seen that the OTDR 20 is coupled to a primary stage optical switch 22. The primary stage optical switch 22 selective interconnects the OTDR 20 with each of the bays 15. Each bay 15 contains a bay optical switch 24. The optical input to each of the bay optical switches 24 is coupled to one of the outputs of the primary stage optical switch 22. Once a particular bay is coupled to the OTDR 20 by the primary stage optical switch 22, then the bay optical switch 24 optically connects one of the fiber distribution shelves 14 contained within that bay to the primary stage optical switch 22 and the OTDR 20.

Each of the fiber distribution shelves 14 present within each of the bays 15 contains a shelf optical switch 30. The optical input to each of the shelf optical switches 14 is coupled to one of the outputs of a bay optical switch 24. Once a particular shelf optical switch 24 is coupled to the OTDR 20, via a bay optical switch 24 and the primary stage optical switch 22, then the targeted shelf optical switch 30 selects one of the connection modules 32 contained within that shelf. The selected connection module 32, therefore becomes optically connected to the OTDR 20, via the shelf optical switch 14, bay optical switch 24 and the primary optical switch 22. Since each connection module 32 is coupled to an optical fiber that creates part of the overall optical network, by controlling the primary stage optical switch 22, bay optical switches 24 and shelf optical switches 30, any optical fiber in the system can be coupled to the OTDR 20 for testing. The controlled switching that connects the OTDR 20 to each of the connection modules 20 can be done periodically as part of a repeating test diagnostic. Alternatively, a systems controller can connect the OTDR 20 to any specific connection module as needed for specialized testing.

Figure 3:
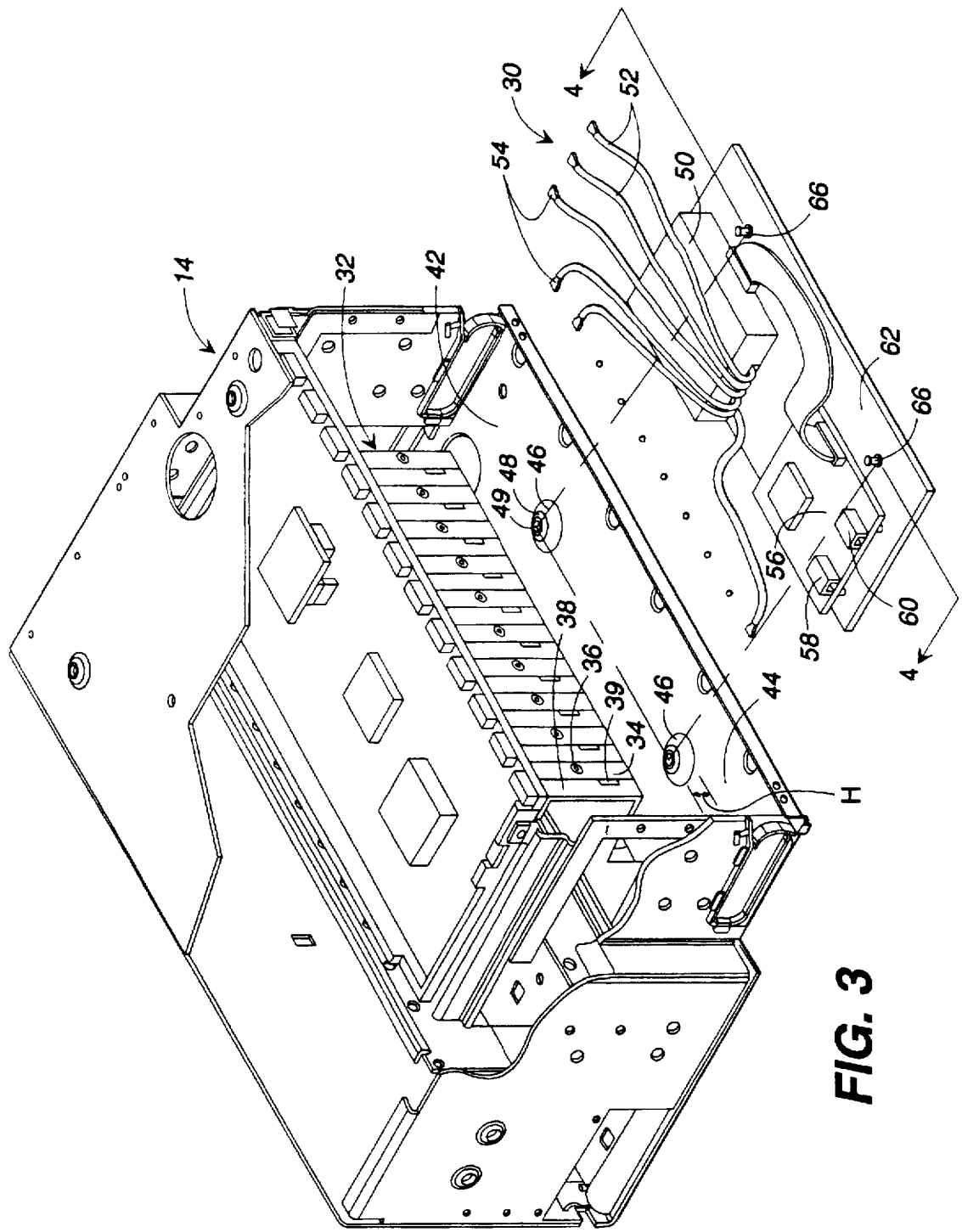
FIG. 3 is a perspective view of a shelf optical switch assembly shown in conjunction with a fiber distribution shelf.

Referring to FIG. 3, a fiber distribution shelf 14 is shown. The fiber distribution shelf 14 contains a rack of connection modules 32 that receive the various optical fibers, via connection ports (not shown) that are disposed on the face of the connection modules 32. Although the connection modules 32 can be of any type used in conjunction with fiber administration systems, the connection modules 32 are preferably of the type having separate optical and electronic subassemblies. Such connection modules are described in detail in U.S. patent application Ser. No. 08/709,977, filed on Sep. 9, 1996, entitled OPTICAL MONITORING AND TESTING MODULE. In such connection modules 32, the module is divided into two detachable subassemblies that include an optical subassembly 34 and an electronic subassembly 38. The optical subassembly 34 contains most all of the optical elements of the overall module. An optical connection port 36 is disposed on the rear of the optical subassembly 34 that attaches to the shelf optical switch 30. The electronic subassembly 38 contains most of the electronic components that make up the overall connection module 32. An electrical connection port 39 is disposed on the electronic subassembly 38 to receive power and command controls.

Figure 4:
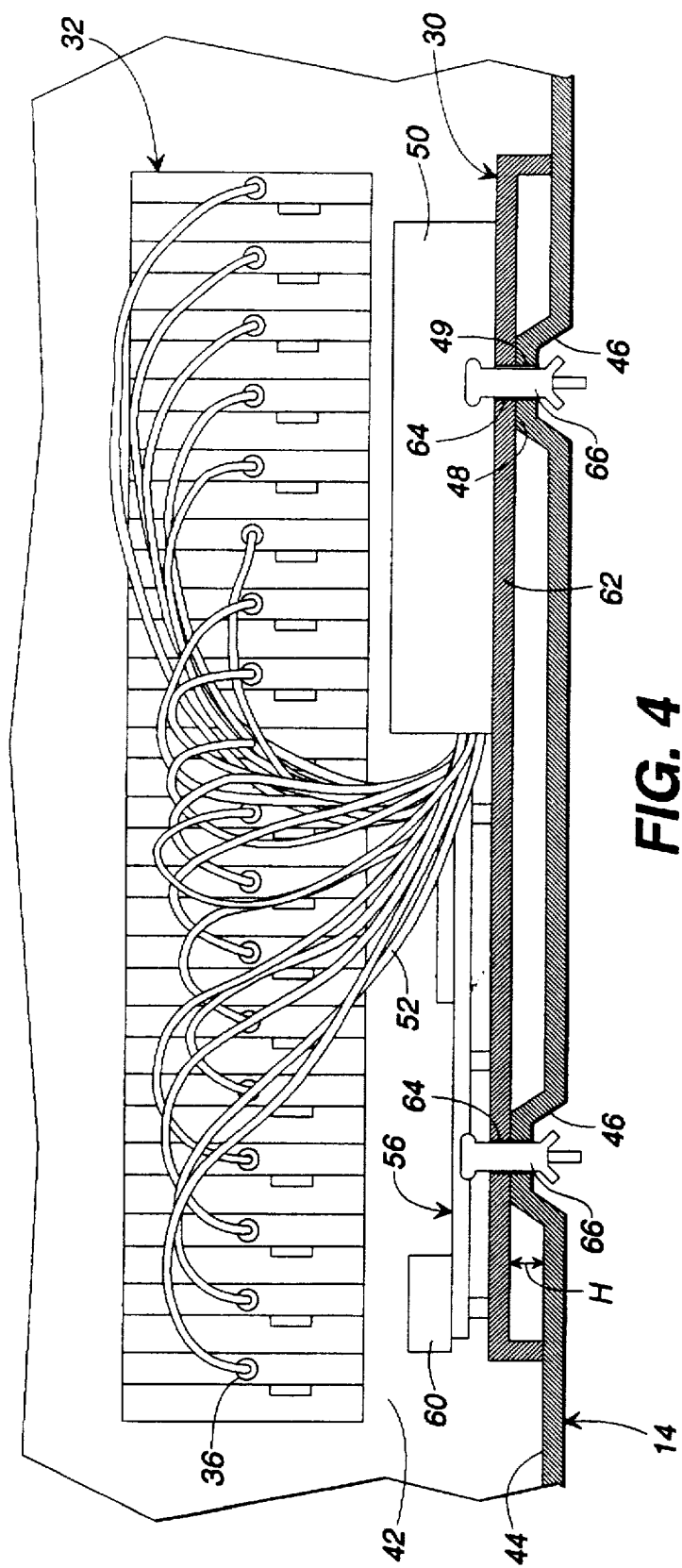
FIG. 4 is fragmented cross-sectional view of the embodiment shown in FIG. 3, viewed along section line 4—4.

Referring to FIG. 3 in conjunction with FIG. 4, it can be seen that when the various connection modules 32 are placed within the distribution shelf 14, an open area 42 of unused space exists in between the bottom of the connection modules 32 and the bottom panel 44 of the fiber distribution shelf 14. Two mounting hubs 46 extend upwardly into the open area 42 from the bottom panel 44 of the fiber distribution shelf 14. Each of the mounting hubs 46 is frustrum shaped having a flat top surface 48 through which a locking aperture 49 passes. Each mounting hub 46 extends upwardly to a height H, which is approximately 0.25 inches above the plane of the bottom panel 44.

The shelf optical switch 30 is an assembly specifically sized to fit within the open area 42 of unused space that exists in between the connection modules 32 and the bottom panel 42 of the fiber distribution shelf 14. The form and function of an optical switch is well known in the prior art and need not be set forth herein. However, in the shown embodiment, the shelf optical switch 30 is divided into two distinct modules, thereby enabling the shelf optical switch 30 to be manufactured with a low profile. The first module is an optical switching module 50 that contains most of the fiber optics and optical circuitry common to an optical switch. A plurality of optical leads 52 extend from the optical switching module 50. The optical leads 52 terminate with connectors 54 that are adapted to engage the optical connection ports 36 on the rear of each connection module 32. The second module of the shelf optical switch 30 is an electronic control module 56 that powers and controls the shelf optical switch 30. At the side of the electronic control module 56 is an electrical connector 58 (FIG. 3) and an optical connector 60. The electrical connector 58 provides a means for supplying power and control signals to the shelf optical switch 30. The optical connector 60 provides a means for coupling the shelf optical switch 30 to one of the outputs of a bay optical switch 24 (FIG. 2).

Both the electronic control module 56 and the optical switching module 50 are connected to a common base 62. The base 62 has a generally planar top surface against which the electronic module 56 and the optical switching module 50 attach. However, the bottom of the base 62 is recessed to a height which is substantially the same as the height H of the mounting hubs 46 on the bottom panel 44 of the fiber distribution shelf 14. As a result, when the base 62 is placed into the fiber distribution shelf 14, the peripheral edges of the base 62 rest upon the shelf's bottom panel 44, while two sections in the middle of the base 62 rest upon the flat top surfaces 48 of the two mounting hubs 46. Two apertures 64 (FIG. 4) are disposed through the base 62. The apertures 64 align with the locking apertures 49 in the center of the mounting hubs 46 when the base is properly seated within the fiber distribution shelf 14. Two fasteners 66 are provided that extend through the apertures 64 in the base 62 and the locking apertures 49 in the mounting hubs 46. The fasteners 66 join the base 62 to the mounting hubs 46, thereby mounting the shelf optical switch 30 into place. Although many different types of fasteners can be used, in a preferred embodiment the fasteners 66 are of a type that can be readily removed by hand. As such, the base 62 and the shelf optical switch 30 it supports can be removed without tools.

Since the shelf optical switch 30 mounts within the confines of the fiber distribution shelf 14, no additional space in the fiber administration system framework needs to be made for the shelf optical switches. Furthermore, since the shelf optical switches 30 mount close to the rear of the connection modules 32 within a fiber distribution shelf 14, the optical leads 52 that extend between the connection modules 32 and the shelf optical switch 30 can be made very short in length. As a result, the previously unused space available on a fiber distribution shelf is utilized in a manner that greatly simplifies the optical lead architecture. This is because optical leads to and from a shelf optical switch need not be used.

Although the shelf optical switch device 30 as described can be used on any prior art fiber administration system that used standard sized fiber distribution shelves, the shelf optical switch is preferably used in a fiber administration system with distributed intelligence, such as that described in U.S. patent application Ser. No. 08/645,108, entitled AN OPTICAL COMMUNICATIONS SYSTEM HAVING DISTRIBUTED INTELLIGENCE, filed May 13, 1996 and U.S. patent application Ser. No. 08/709,978, entitled OPTICAL FIBER OPERATION CENTER, filed Sep. 9, 1996, both of which being previously incorporated by reference. In such a modular fiber administration system, the shelf optical switch can be given a specific controller address and can be controlled by the central controller of the overall optical fiber administration system. As a result, the interconnection of the various connection modules on the fiber distribution shelves to a common OTDR can be done in an automated fashion. This enables the overall optical fiber distribution system to constantly monitor the integrity of the optical fibers leading to and from that system.

It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. A fiber distribution shelf assembly for use in an optical fiber administration system, comprising:

a shelf structure defining a confined space;

a plurality of connection modules supported by said shelf structure within said confined space, wherein an open area of unused space exists in between a bottom surface of said connection modules and a bottom panel of said shelf structure;

an optical switch disposed within said shelf structure within said confined space for placement within said open area between said bottom surface of said connection modules and said bottom panel of said shelf structure; and a plurality of optical leads optically coupling said connection modules to said optical switch within said confined space.

2. The assembly according to claim 1, further including a base member, wherein said optical switch is affixed to said base member and said base member mounts to said shelf structure within said confined space.

3. The assembly according to claim 2, further including removable fasteners, wherein said removable fasteners mechanically join said base member to said shelf structure within said confined space.

4. The assembly according to claim 1, wherein said optical switch includes an optical input port and an electrical input port.

5. The assembly according to claim 1, wherein said optical switch includes an optical switching module and an electronic control module joined together on a common support.

6. The assembly according to claim 1, wherein said shelf structure contains mounting hubs disposed within said confined space and said optical switch mounts to said mounting hubs.

7. In an optical fiber administration system having a frame structure that defines bays and having at least one fiber distribution shelf disposed within said bays, wherein each said fiber distribution shelf contains a plurality of optical fiber connection modules, an optical switching system comprising:

a primary stage optical switch having a single optical input and a first plurality of optical outputs;

a bay optical switch for each of said bays, wherein each said bay optical switch has an input port coupled to one of said first plurality of optical outputs of said primary stage optical switch, and each said bay optical switch has a second plurality of optical outputs;

a shelf optical switch contained within each said fiber distribution shelf wherein each said shelf optical switch has an input port coupled to one of said second plurality of optical outputs of said bay optical switch, and each said shelf optical switch has a third plurality of optical outputs that connect to said optical fiber connection modules.

8. The system according to claim 7, further including an optical time domain reflectometer, wherein said optical time domain reflectometer is optically coupled to said optical input of said primary stage optical switch.

9. The system according to claim 7, wherein said fiber distribution shelf assembly includes a shelf structure defining a confined space, wherein said connection modules are supported by said shelf structure within said confined space, and each said shelf optical switch is mounted to each said shelf structure within said confined space.

10. The system according to claim 9, further including a plurality of optical leads optically coupling said connection modules to said shelf optical switch within said confined space.

11. In an optical fiber administration system containing an optical time domain reflectometer and having a frame structure that defines bays, wherein at least one fiber distribution shelf is disposed within said bays and each said fiber distribution shelf contains a plurality of optical fiber connection modules, a method of selectively optically connecting said optical time domain reflectometer to a selected one of said connection modules, comprising the steps of:

providing a primary stage optical switch having an optical input coupled to said optical time domain reflectometer;

providing a bay optical switch for each said bay wherein each said bay optical switch has an input coupled to an output of said primary stage optical switch;

providing a shelf optical switch within each said fiber distribution shelf, wherein each shelf optical switch has an input coupled to an output of one said bay optical switch;

selectively switching said primary stage optical switch wherein said optical time domain reflectometer becomes coupled to the bay optical switch for the bat that contains said selected one of said connection modules;

selectively switching the bay optical switch wherein said optical time domain reflectometer becomes coupled to the shelf optical switch within the fiber distribution shelf that contains said selected one of said connection modules; and selectively switching the shelf optical switch wherein said optical time domain reflectometer becomes coupled to said selected one of said connection modules.

12. The method according to claim 11, wherein said fiber distribution shelf assembly includes a shelf structure defining a confined space, wherein said connection modules are supported by said shelf structure within said confined space, and each said shelf optical switch is mounted to each said shelf structure within said confined space.

* * * * *